US011657420B2

(12) United States Patent
Zhang et al.

(10) Patent No.: US 11,657,420 B2
(45) Date of Patent: May 23, 2023

(54) COMPUTING ESTIMATED VALUE OF PROVIDING SERVICE AMONG GEOGRAPHICAL REGIONS

(71) Applicant: Uber Technologies, Inc., San Francisco, CA (US)

(72) Inventors: Haowei Zhang, Sunnyvale, CA (US); Monique Johanna Maria van den Boogaart, San Francisco, CA (US); Hao Min, Santa Clara, CA (US)

(73) Assignee: Uber Technologies, Inc., San Francisco, CA (US)

(*) Notice: Subject to any disclaimer, the term of this patent is extended or adjusted under 35 U.S.C. 154(b) by 0 days.

(21) Appl. No.: 17/382,022

(22) Filed: Jul. 21, 2021

(65) Prior Publication Data

US 2022/0005056 A1  Jan. 6, 2022

Related U.S. Application Data

(63) Continuation of application No. 16/685,903, filed on Nov. 15, 2019, now Pat. No. 11,107,101, which is a
(Continued)

(51) Int. Cl.
*G06Q 30/02* (2023.01)
*G06Q 50/30* (2012.01)
(Continued)

(52) U.S. Cl.
CPC ......... *G06Q 30/0206* (2013.01); *G06N 20/00* (2019.01); *G06Q 10/067* (2013.01); *G06Q 50/30* (2013.01); *G06F 3/04847* (2013.01)

(58) Field of Classification Search
CPC .. G06Q 30/0206; G06Q 10/067; G06Q 50/30; G06N 20/00; G06N 7/005; G06F 3/04847
(Continued)

(56) References Cited

U.S. PATENT DOCUMENTS 10,510,089 B2   12/2019   Zhang et al.
2014/0243013 A1   8/2014   Liu et al.
(Continued)

FOREIGN PATENT DOCUMENTS

WO   WO 2010/127098 A2   11/2010

OTHER PUBLICATIONS

MMA, Demystifying Location Data Accuracy, 2015 (Year: 2015).*
(Continued)

*Primary Examiner* — Tarek Elchanti
(74) *Attorney, Agent, or Firm* — Fenwick & West LLP

(57) ABSTRACT

A system predicts a value estimate for a user who provides a service that involves moving among geographical regions (e.g., a transportation service). The system determines the value estimate by identifying a sequence of time periods, each time period having an associated set of geographical regions. Possible transitions between geographical regions in different time periods are analyzed, for example, using statistical or machine-learned models, to determine likelihoods that the user will move between the geographical regions from one time period to another, and to determine expected values for a transition. Such models may be trained or developed using historical service data and user profile data stored by the system. Transitions are analyzed over a sequence of time periods to determine accumulated values associated with estimated overall values for each geographical region. The system predicts an overall value estimate for the user based on the accumulated values.

20 Claims, 7 Drawing Sheets

Related U.S. Application Data continuation of application No. 15/676,924, filed on Aug. 14, 2017, now Pat. No. 10,510,089.

(51) Int. Cl.
| | |
|---|---|
| *G06Q 10/06* | (2023.01) |
| *G06N 20/00* | (2019.01) |
| *G06F 3/04847* | (2022.01) |
| *G06Q 30/0201* | (2023.01) |
| *G06Q 10/067* | (2023.01) |

(58) Field of Classification Search
USPC .................................. 705/7.31; 455/456.1
See application file for complete search history.

(56) References Cited

U.S. PATENT DOCUMENTS

| | | |
|---|---|---|
| 2015/0106888 A1 | 4/2015 | Cheng et al. |
| 2015/0154612 A1 | 6/2015 | Grundman |
| 2015/0249905 A1* | 9/2015 | Haro ..................... H04W 4/025 455/456.1 |
| 2015/0379531 A1* | 12/2015 | Christian ........... G06Q 30/0202 705/7.31 |

OTHER PUBLICATIONS

De Groot, R. et al., "Global estimates of the value of ecosystems and their services in monetary units," Ecosystem Services, vol. 1, Iss. 1, Jul. 2012, pp. 50-61.

Mittal, V. et al., "Geographic Patterns in Customer Service and Satisfaction: An Empirical Investigation," Journal of Marketing, vol. 68, Jul. 2004, pp. 48-62.

United States Office Action, U.S. Appl. No. 16/685,903, dated Dec. 4, 2020, ten pages.

United States Office Action, U.S. Appl. No. 16/685,903, dated Sep. 14, 2020, four pages.

United States Pre-Interview Communication, U.S. Appl. No. 15/676,924, dated Jun. 10, 2019, four pages.

* cited by examiner

COMPUTING ESTIMATED VALUE OF PROVIDING SERVICE AMONG GEOGRAPHICAL REGIONS

CROSS REFERENCE TO RELATED APPLICATIONS

This application is a continuation of copending U.S. application Ser. No. 16/685,903, filed Nov. 15, 2019, which is a continuation of U.S. application Ser. No. 15/676,924, U.S. Pat. No. 10,510,089, filed Aug. 14, 2017, all of which are incorporated by reference in their entirety.

BACKGROUND

Field of Art

This disclosure relates generally to estimating value associated with services a user is likely to provide, and more particularly to estimating value in conjunction with predicted movement of a user between geographical regions over time.

Description of Art

Computerized systems provide a transport service by connecting users requesting service (e.g., "requesters") with users available to transport them (e.g., "providers"). When a requester submits a request for a service to the system, the system may select a provider to service the request and transport the requester to a destination of the request.

Providers may receive compensation for transporting requesters from start locations to destinations and for facilitating other services, such as deliveries. The amount of compensation a provider receives for a service (i.e., the "value" of the service) may be based on a distance between a start location and a destination, a service duration, incentives offered by a coordination system, and the like. Providers may choose when and where to offer services to requesters. Although information about geographical regions with high demand for providers is sometimes available in real-time, many providers do not know how best to anticipate geographical regions and time periods in which they will receive the most compensation for providing services in the future.

SUMMARY

A system estimates value for a provider using information such as times the provider plans to provide transportation and geographical regions in which the provider may operate during those times. The value estimate is presented to the provider. In some embodiments, the provider may provide inputs such as time ranges of planned operation and preferred starting regions. The system may predict value based on a provider's input, or the system may suggest other times or regions for operating that have higher estimated values.

The system determines value estimates by analyzing possible transitions that a provider could make between geographical regions over time. The system divides a provider's expected time range of operation into time periods and associates a set of geographical regions with each time period. Starting with a final time period and working in reverse chronological order, the system determines possible transitions between geographical regions in each time period and geographical regions in a preceding time period. Models are used to determine a probability that the provider will transition between the geographical regions and to determine an expected value for each transition. The models may be developed using past service data stored by the system and using user profile data about providers.

As the transitions are analyzed, geographical regions are assigned accumulated values that account for the probabilities and expected values of geographical regions in previously analyzed time periods. The system uses a final accumulated value to provide a value estimate to the provider.

The features and advantages described in this summary and the following detailed description are not limiting and are not all-inclusive. Many additional features and advantages will be apparent to one of ordinary skill in the art in view of the drawings, specification, and claims hereof.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

A system estimates and presents an estimated value of a user's potential value accrued over a time period during which the user provides location-based services that may include movement by the user to different geographical regions. The system uses historical service data, real-time service data, and user profile information about providers to determine likely values for providers operating in different geographical regions at different times, and to determine likelihoods that a provider provides service across the geographical regions. Providers can interact with applications on a user device to explore valuation opportunities associated with providing services in different geographical regions at different times of a day and days of a week.

Figure 1:
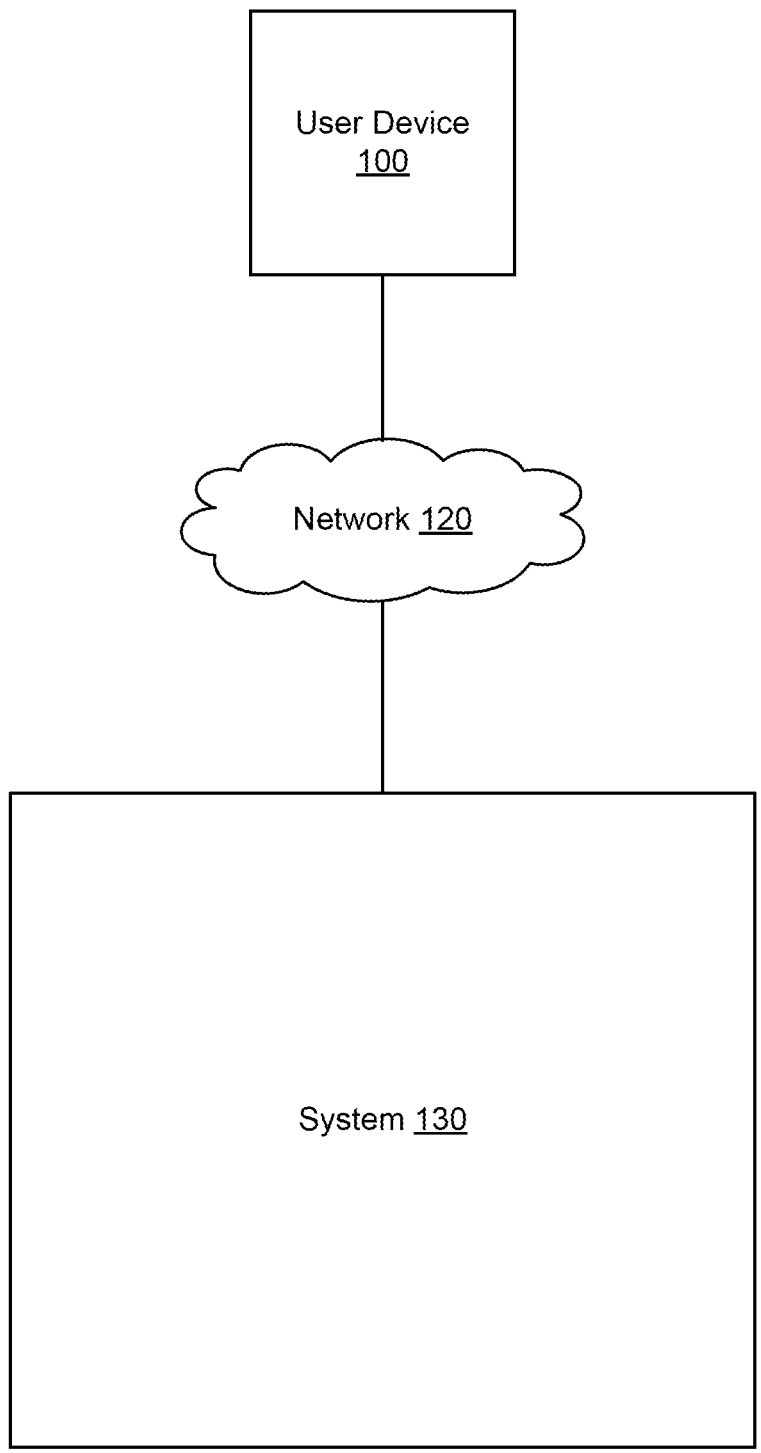
FIG. 1 is a high-level block diagram of a system environment for a system, in accordance with an embodiment.

FIG. 1 is a high-level block diagram of a system environment for a system 130, in accordance with some embodiments. The system 130 can facilitate coordination of a number of services between a requester device and a provider device. Example embodiments below are described in the context of requesting, coordinating, and providing services for travel or transport. However, it will be appreciated that the system 130 can facilitate any suitable number of services in alternative embodiments. For instance, examples of services can include transportation of items (such as food, products, freight cargo, medical items, animals, etc.) or services (medical care, entertainment, labor, etc.).

In the example shown in FIG. 1, a system environment includes a user device 100, a network 120, and the system 130. For clarity, although only one user device 100 is shown in FIG. 1, alternate embodiments of the system environment can have any number of user devices 100. The functions performed by the various entities of FIG. 1 may vary in different embodiments. The system 130 stores information about past services, ongoing services, and providers. When a provider requests a value estimate, the system 130 may analyze the stored data to determine likely values for the provider during a period of operation over a geographical region.

A requester requests service (via a "service request") from the system 130 through a user device 100. A provider receives requests to provide service from the system 130 through a user device 100. User devices may be personal or mobile computing devices, such as smartphones, tablets, or notebook computers. In some embodiments, a user device 100 executes a client application that uses an application programming interface (API) to communicate with the system 130 over the network 120.

A provider can use the user device 100 to interact with the system 130 and receive invitations to provide services for requesters. In some embodiments, the provider is a person operating a vehicle capable of transporting passengers. For convenience, this disclosure generally uses a car with a driver as an example provider. However, the embodiments described herein may be adapted for a provider operating alternative vehicles, or performing alternative services (e.g., delivering food).

A provider can receive assignment requests through the user device 100. An assignment request identifies a requester who submitted a service request to the system 130 and identifies the start location of the requester for a service. For example, the system 130 can receive a service request from a requester's user device 100, select a provider from a pool of available (or "open") or soon-to-be available users to provide the service, and transmit an assignment request to the selected provider's user device 100. In some embodiments, a provider can indicate availability, via a client application on the user device 100, for receiving assignment requests. This availability may also be referred to herein as being "online" (available to receive assignment requests) or "offline" (unavailable to receive assignment requests). For example, a provider can decide to start receiving assignment requests by going online (e.g., by launching a client application or providing input on the client application to indicate that the provider wants to receive invitations), and stop receiving assignment requests by going offline. In some embodiments, when a provider's user device 100 receives an assignment request, the provider has the option of accepting or rejecting the assignment request. By accepting the assignment request, the provider is assigned to the requester, and is provided the requester's service details, such as start location and service destination location. In one example, the requester's service details are provided to the user device 100 of the provider as part of the invitation or assignment request. Assignment requests may occur randomly (in that a requester may submit a service request at any time), and the provider may have no control over a destination location of a service associated with a service request.

A user device 100 may interact with the system 130 through client applications configured to interact with the system 130. A client application of the user device 100 can present information received from the system 130 on a user interface. For example, a client application may include an interactive user interface through which a provider can enter preferred service times and geographical regions and see corresponding value estimates. In some embodiments, the client application running on the user device 100 may have additional capabilities, such as displaying maps, determining a current location of the user device 100, and the like.

A user device 100 can communicate with the system 130 via the network 120, which may comprise any combination of local area and wide area networks employing wired or wireless communication links. In some embodiments, all or some of the communication on the network 120 may be encrypted.

Figure 2:
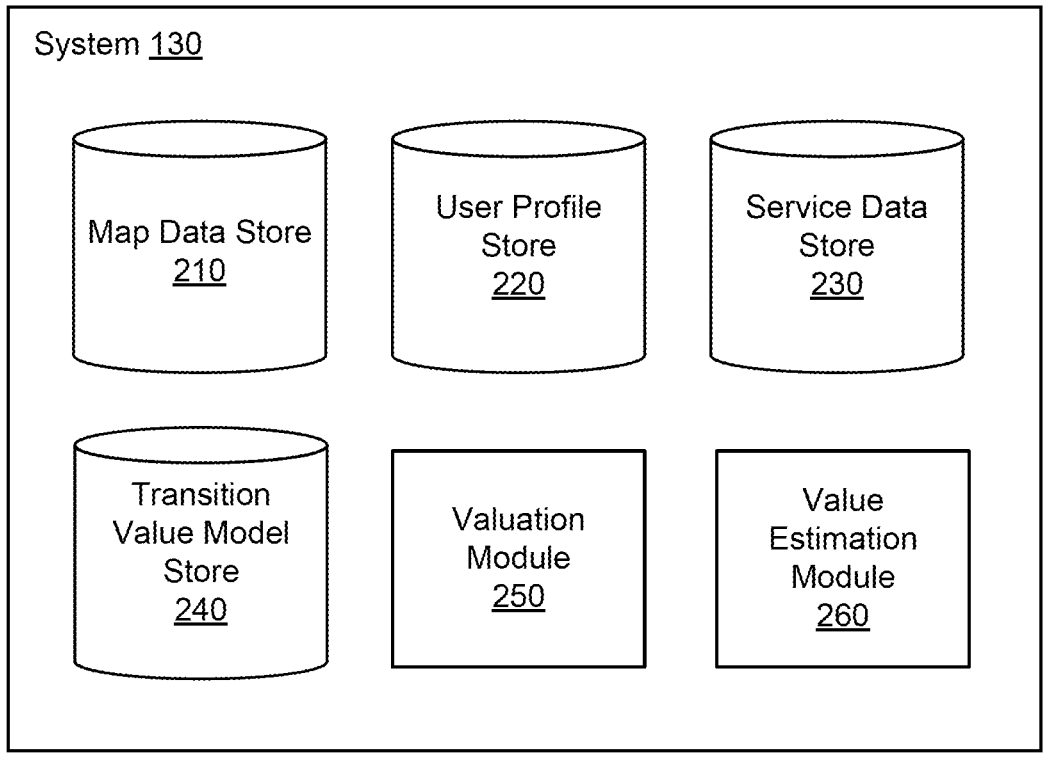
FIG. 2 is a high-level block diagram of a system architecture for a system, in accordance with an embodiment.

FIG. 2 is a high-level block diagram of a system architecture for the system 130, in accordance with some embodiments. The system includes various modules and data stores to match providers with requesters, analyze past and present service data, and predict value estimates. The system 130 includes a map data store 210, a user profile store 220, a service data store 230, a transition value model store 240, a valuation module 250, and value estimation module 260. Computer components such as web servers, network interfaces, security functions, load balancers, failover servers, management and network operations consoles, and the like are not shown so as to not obscure the details of the system architecture. Additionally, the system 130 may contain more, fewer, or different components than those shown in FIG. 2 and the functionality of the components as described herein may be distributed differently from the description herein. Furthermore, the components of FIG. 2 can be included, additionally or alternatively, in any suitable component shown in FIG. 1.

The map data store 210 stores maps of geographical regions in which the system 130 offers services (and may additionally store maps of wider geographical areas in which the geographical regions are located). The maps contain information about roads within the geographical regions. For the purposes of this disclosure, roads can include any route between two places that allows travel by foot, motor vehicle, bicycle or another form of travel. Examples of roads include streets, highways, freeways, trails, bridges, tunnels, toll roads, waterways, airways, or crossings. Roads may be restricted to certain users, or may be available for public use. Roads can connect to other roads at intersections. An intersection is a section of one or more roads that allows a user to travel from one road to another. Roads are divided into road segments, where road segments are portions of roads that are uninterrupted by intersections with other roads. For example, a road segment would extend between two adjacent intersections on a surface street or between two adjacent entrances/exits on a highway.

A map of a geographical region may be represented using a graph of the road segments. In some embodiments, the nodes of a graph of a map are road segments and edges between road segments represent intersections of road segments. In some embodiments, nodes of the graph represent intersections between road segments and edges represent the road segments themselves. The map data store 210 also stores properties of the map, which may be stored in association with nodes or edges of a graph representing the map. Map properties can include road properties that describe characteristics of the road segments, such as speed limits, road directionality (e.g., one-way, two-way), traffic history, traffic conditions, addresses on the road segment, length of the road segment, and type of the road segment (e.g., surface street, residential, highway, toll). The map properties also can include properties about intersections, such as turn restrictions, light timing information, throughput, and connecting road segments. In some embodiments, the map properties also include properties describing the geographical region as a whole or portions of the geographical region, such as weather within the geographical region, geopolitical boundaries (e.g., city limits, county borders, state borders, country borders), and topological properties.

A geographical area may be subdivided into many smaller geographical regions. Borders of geographical regions may be established along political boundaries (e.g., city borders), census tracts, neighborhood outlines, using arbitrary grid cells (e.g., an overlay of hexagons on a map), or as a group of grid cells selected based on one or more characteristics of a geographical area that is being subdivided. In some embodiments, the map data store 210 may designate geographical regions using geofences. A geofence is a virtual perimeter geographically enclosing a portion of map data. Geofences may be used to delineate specific geographical regions and may be applied for various reasons, such as categorization or alerts. For example, a geofence can provide a mechanism for alerting the system 130 whenever a user device 100 enters or leaves a geographical region.

The user profile store 220 stores information about providers. For example, the user profile store 220 may include type of service provided, provider ratings, data about past service, an average number of services provided per hour, vehicle type, common hours online, an average arrival time in relation to a predicted estimated time of arrival, whether the provider typically follows suggested service instructions (e.g., routes), geographical regions most frequently visited by the provider, an average amount of time the provider is willing to wait for a new assignment, and so forth. Data about providers may be collected by the system 130, for example, via provider interactions with applications on a user device 100, and via requester feedback about the provider. User profile data may be used to determine a provider's probability of behaving in certain ways, for example, whether a provider is likely to follow a suggested service instruction, and whether a provider is likely to provide service among different geographical regions, for example, when responding to a service request from a requester.

The service data store 230 includes information about services coordinated by the system 130. The service data store 230 may store data about services provided by multiple providers. Information about past services may include an origin (e.g., start location), destination, estimated duration, actual duration, route (e.g., road segments and intersections used to get from an origin to a destination), date, time, value, incentives offered to a provider, geographical regions through which a route passed, traffic conditions, etc. Service data may be used to determine probabilities associated with providers travelling between certain geographical regions, and to predict values for individual services based on past services and values. In one embodiment, the service data store 230 includes data about ongoing and recently completed services. Recent service data may allow the system 130 to infer current road conditions such as slow traffic in different geographical regions or along different road segments, a number of providers who are currently online, a number of current service requests, current values, etc. Historical and recent service data is used to improve predicted value estimations for individual services and to improve estimates related to likelihoods that providers will travel across geographical regions.

The system 130 estimates values for a provider by determining likelihoods that a provider will be in different geographical regions at different time periods within a time range. The system predicts values that may be associated with the provider's possible movements across the geographical regions at those time periods. For example, the system 130 may predict that a provider will be in one geographical region at a time period and that the provider will move to another geographical region by the next time period. Such transitions between geographical regions from one time period to the next time period are assigned a probability of occurring and an expected value that represents a predicted value for a provider who makes that transition. In some embodiments, expected values may be influenced by current and recent changes in service values and special incentives that may apply to the provider.

The transition value model store 240 stores models that may be used to assign probabilities and expected values to possible transitions between geographical regions. According to an embodiment, models stored in the transition value model store 240 may be statistical models, machine learned models, or another type of model. Input to the models may include service data from the service data store 230 and provider profile data from the user profile store 220. In some embodiments, the models may be retrained or regenerated using information from the map data store 210, the user profile store 220, or the service data store 230 as training data. In one embodiment, different models are developed for individual providers using user profile data about preferences and historical trends of each provider to personalize predictions probabilities and value estimations. Since providers often do not have control over the timing or destination locations of service requests, the models may also be trained using past service data about the likelihood of service requests occurring within a region at a certain time, and destination locations associated with services from the region.

The valuation module 250 analyzes a sequence of time periods, each time period having an associated set of geographical regions, and assigns accumulated values to geographical regions within the time periods. In one embodiment, an accumulated value represents an estimated overall value to a provider if the provider was to start at the geographical area during that time period and continue providing services until a final time period. In another embodiment, an accumulated value represents an overall value estimate that the system 130 predicts a provider will have once the provider reaches the geographical region during the time period for which the accumulated value was assigned to the geographical region.

Figure 5:
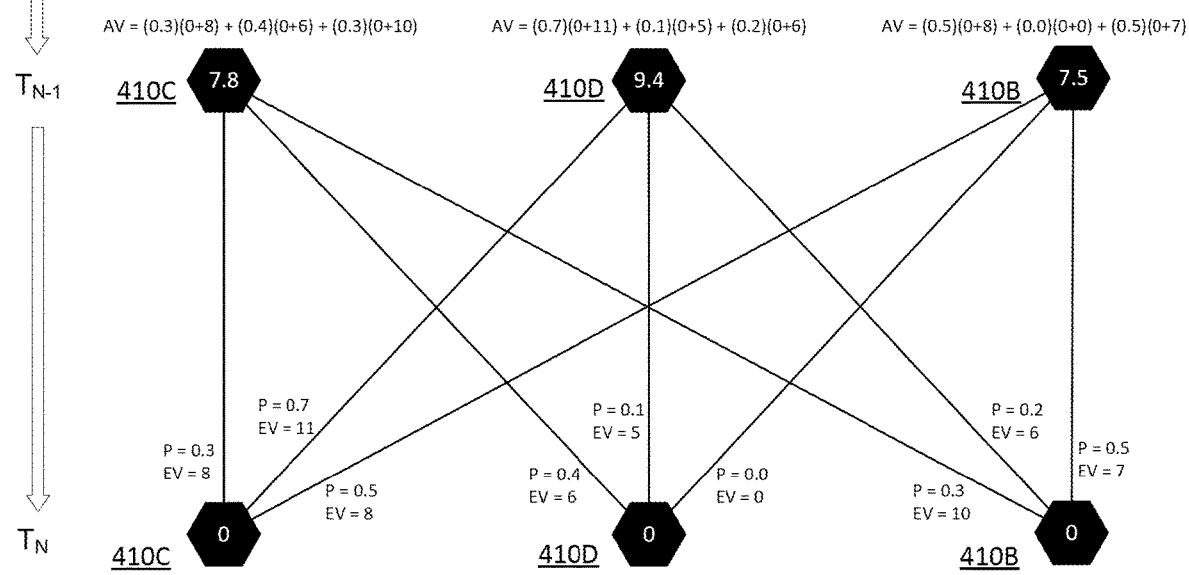
FIG. 5 is a diagram depicting an example of calculating an accumulated value for a provider within a time range in view of possible transitions between geographical regions, in accordance with an embodiment.

In some embodiments, the valuation module 250 may receive a start time, an end time, and a starting region as input. For example, a provider may input a range of time during which the provider plans to be available for and provide services. The valuation module 250 divides the range of time between the start time and the end time into a sequence of time periods (e.g., ten minute intervals). To determine a value estimate, the valuation module 250 determines accumulated values associated with regions for each time period. In one embodiment, an accumulated value assigned to a particular geographical region is a weighted sum of accumulated values from previous geographical regions and expected values of the transitions between the geographical regions for the time periods, wherein the weighting accounts for the probability that the provider will make the transition between the two geographical regions. Such a probability may be affected by historical service data about the provider, uncertainties in starting and ending times of services, occurrences of service requests, and destinations associated with services from the geographical region. The below description of FIG. 5 provides additional detail about how accumulated values are calculated by the valuation module 250.

The value estimation module 260 determines a value estimate to present to a user. In one embodiment, the value estimation module 260 may use an accumulated value that represents an accumulation of value estimates over a whole time range of operation as an estimate to present to a user. In some embodiments, the value estimation module 260 may further analyze accumulated values calculated for geographical regions at different time periods to determine values to present to a user. For example, the value estimation module 260 may estimate a number of service requests the provider will be able to complete, or may predict accumulated values associated with geographical regions at different times.

In some embodiments, the system 130 recalculates estimated values as a provider operates within an indicated time range. Thus, estimated values may be adjusted in real time as the provider transitions between regions and as actual value is accrued. The value estimation module 260 may accordingly update an estimated value for a provider. In some embodiments, the value estimation module 260 may also present suggestions to a provider, such as time ranges and regions in which the provider will have a higher value estimation.

Figures 3A, 3B:
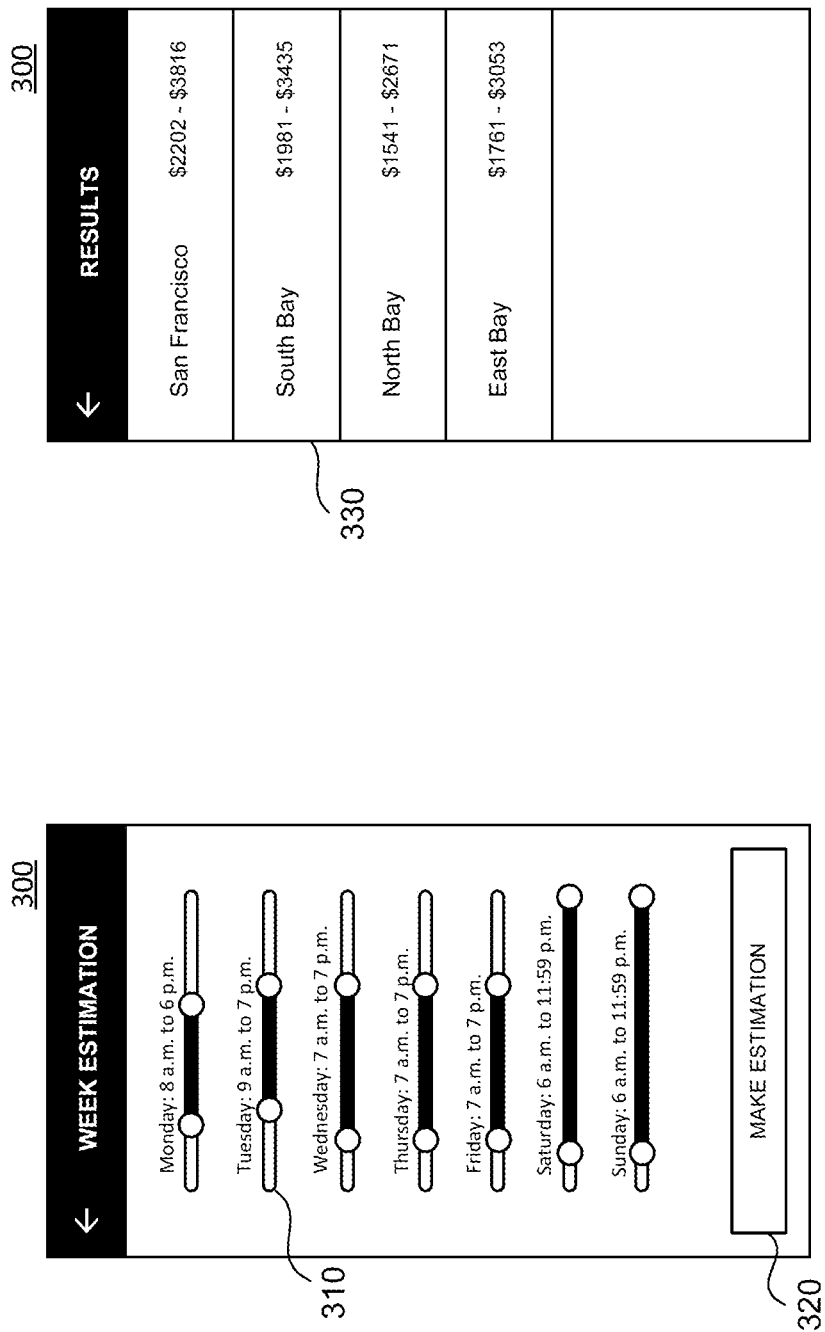
FIG. 3A illustrates an example user interface that accepts input from a provider about planned operation times, in accordance with an embodiment.
FIG. 3B illustrates an example user interface that displays value estimates for a provider, in accordance with an embodiment.

FIG. 3A illustrates an example user interface through which a provider may input anticipated times when the provider will be providing services or be available to provide services, in accordance with one embodiment. A user interface 300 includes user interaction components such as sliders 310 which a provider may use to indicate time ranges during which the provider plans to be online. In the example shown in FIG. 3A, a provider can adjust sliders 310 to indicate an anticipated start time and end time for each day of a week. In one embodiment, the user interface 300 may also include a user interface component that a provider can use to indicate a preferred starting region (e.g., a region near the provider's home). The user interface 300 may additionally include a user interface component such as a button 320 that indicates to the system 130 that data provided by a user is ready to be analyzed.

FIG. 3B illustrates an example user interface for displaying value estimations to a provider. In one example embodiment, the user interface 300 includes regional records 330 that show estimated value amounts associated with operation of a provider within a geographical area (which may include multiple geographical regions). For example, FIG. 3B shows estimated values associated with a provider operating at the times indicated in the user interface of FIG. 3A for geographical areas including San Francisco, the South Bay, the North Bay, and the East Bay. In some embodiments, the user interface 300 may display value estimates for only one geographical area, for example, in cases when a provider enters a preferred geographical region when inputting data for analysis. In still another embodiment, regional records 330 may present value estimates associated with more specific starting geographical regions, rather than with wider geographical areas.

Figure 4:
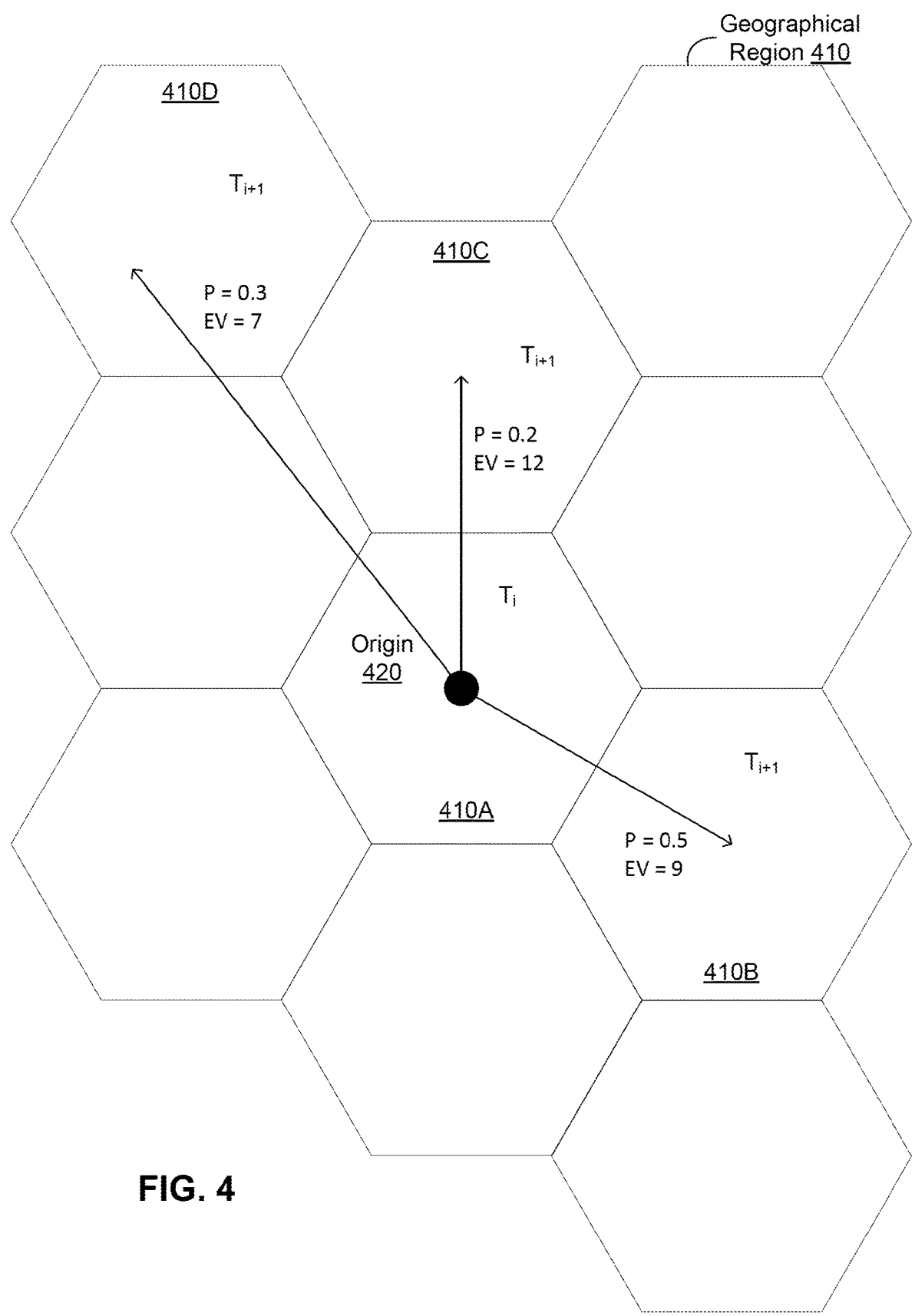
FIG. 4 illustrates transitions between geographical regions from one time period to a subsequent time period, in accordance with an embodiment.

FIG. 4 illustrates transitions between geographical regions from one time period and geographical regions from a subsequent time period, in accordance with an embodiment. As described previously, a geographical region 410 is a subdivision of a geographical area. For example, in FIG. 4, a map is divided into multiple geographical regions 410 in the form of hexagons. Geographical regions 410 may represent large or small physical areas. When a provider is online, the provider travels within and across one or more geographical regions 410, for example, when transporting requesters who request transportation services. To determine estimated values for a provider within a sequence of time periods, the valuation module 250 uses transition models from the transition model store 240 to predict probabilities that the provider will move between two geographical regions 410 from one time period to the next time period. The transition models are also used to predict estimated values associated with possible transitions between geographical regions 410 (e.g., an estimation of how much value the provider will receive given that the provider does transition to a subsequent geographical region 410). For example, FIG. 4 represents a provider beginning at an origin 420 within geographical region 410A at time period $T_i$. In the example, the provider is expected to travel to geographical region 410B by a next time period $T_{i+1}$ with a probability of 0.5 and an expected value of 9. Similarly, the provider is expected to travel to geographical region 410C at time period $T_{i+1}$ with a probability of 0.2 and an expected value of 12 and to geographical region 410 D at time period $T_{i+1}$ with a probability of 0.3 and an expected value of 7. In some embodiments probabilities and expected values may be assigned to every geographical region 410. In some embodiments, geographical regions 410 are associated with time periods according to whether the provider could feasibly move from the provider's location in a first time period to the geographical region 410 by the next time period. For example, if a geographical region 410 is too far away from a provider's possible positions to be reached by the provider at a subsequent time period by travelling at a speed that is physically possible (or that is within a speed limit), then the geographical region 410 may not be associated with the subsequent time period. It is further noted that remaining within the same geographical region 410 from one time period to the next time period may also be considered as a possible transition.

FIG. 5 is a diagram depicting an example of calculating an accumulated value for a provider within a time range in view of possible transitions between geographical regions, in accordance with an embodiment. The example of FIG. 5 shows calculations and predictions for a provider beginning at origin location 420 in geographical region 410A and transitioning among geographical regions 410C, 410D, and 410B over a sequence of time periods 510. In the example of FIG. 5, regions 410 are shown as hexagons, and lines between the hexagons represent possible transitions between regions. In some embodiments, each time period (e.g., each row of hexagons in FIG. 5) may be associated with differing subsets of geographical regions 410, as opposed to the example of FIG. 5, which includes the same three geographical regions 410 at $T_{i+1}$, $T_{N-1}$, and $T_N$.

A provider may input an expected origin 420, which is associated with a geographical region 410 in which it is located (e.g., geographical region 410A, shown in the example figures). The provider may also input a time range, which the system 130 divides into time periods 510 (e.g., $T_i$, $T_{i+1}$, ..., $T_{N-1}$, $T_N$). The valuation module 250 considers some or all geographical regions 410 where the provider could be located at the final (e.g., latest) time period at the end of the time range, represented in FIG. 5 as $T_N$. In reverse chronological order, the valuation module 250 applies transition value models from the transition valuation model store 240 to assign probabilities and expected values to possible transitions between geographical regions 410 between time periods 510.

Accumulated values, shown as numbers within the hexagons of FIG. 5, are calculated for the geographical regions 410 associated with each of the time periods 510. In one embodiment, accumulated values are weighted sums that account for probabilities of transitioning to geographical regions 410 in a next time period and for expected values associated with those transitions. Calculations for an accumulated value also incorporate previously calculated accumulated values that have been determined for regions in later time periods. For example, the accumulated value associated with the provider's origin location 420 in FIG. 5 is the accumulated value of region 410C at time period $T_{i+1}$, added to the expected value of a transition from geographical region 410A to geographical region 410C between time periods $T_i$ and $T_{i+1}$, multiplied by the probability of the transition, and added to similar values for possible transitions from geographical region 410A to geographical regions 410D and 410B for the same time periods 510. After accumulated value calculations have propagated from the final time period 510 to the starting time period 510 (e.g., from $T_N$ to $T_i$), the accumulated values at one or more geographical regions 410 associated with the starting time period represent value estimates for the provider for the time range that includes the time periods 510. Although the example of FIG. 5 shows only one starting geographical region 410A, some embodiments can include final accumulated values for multiple geographical regions 410, as when a provider does not input a starting geographical region 410, or for the purposes of calculating different estimated values based on different starting geographical regions 410.

The described calculations may be performed using dynamic programming techniques. That is, accumulated value calculations for earlier time periods 510 in the range of time periods 510 are determined using previously calculated accumulated values associated with geographical regions 410 of later time periods 510. Dynamic programming reduces the complexity of the problem and makes it feasible to calculate accumulated values in view of large numbers of geographical regions 410 and divisions of time ranges into many time periods 510.

In some embodiments, rather than beginning the calculations at geographical regions 410 associated with a final time period 510 and working backward, the valuation module 250 begins at one or more possible starting geographical regions 410 and calculates accumulated values in chronological order, until an accumulated value has been calculated for geographical regions 410 associated with a final time period 510. Determining accumulated values in chronological order may be beneficial in some cases because the valuation module 250 can avoid predicting probabilities and expected values for transitions that are not feasible for the provider to make between two time periods (and thus may avoid calculating values for future transitions that would have begun with such an impossible transition).

Figure 6:
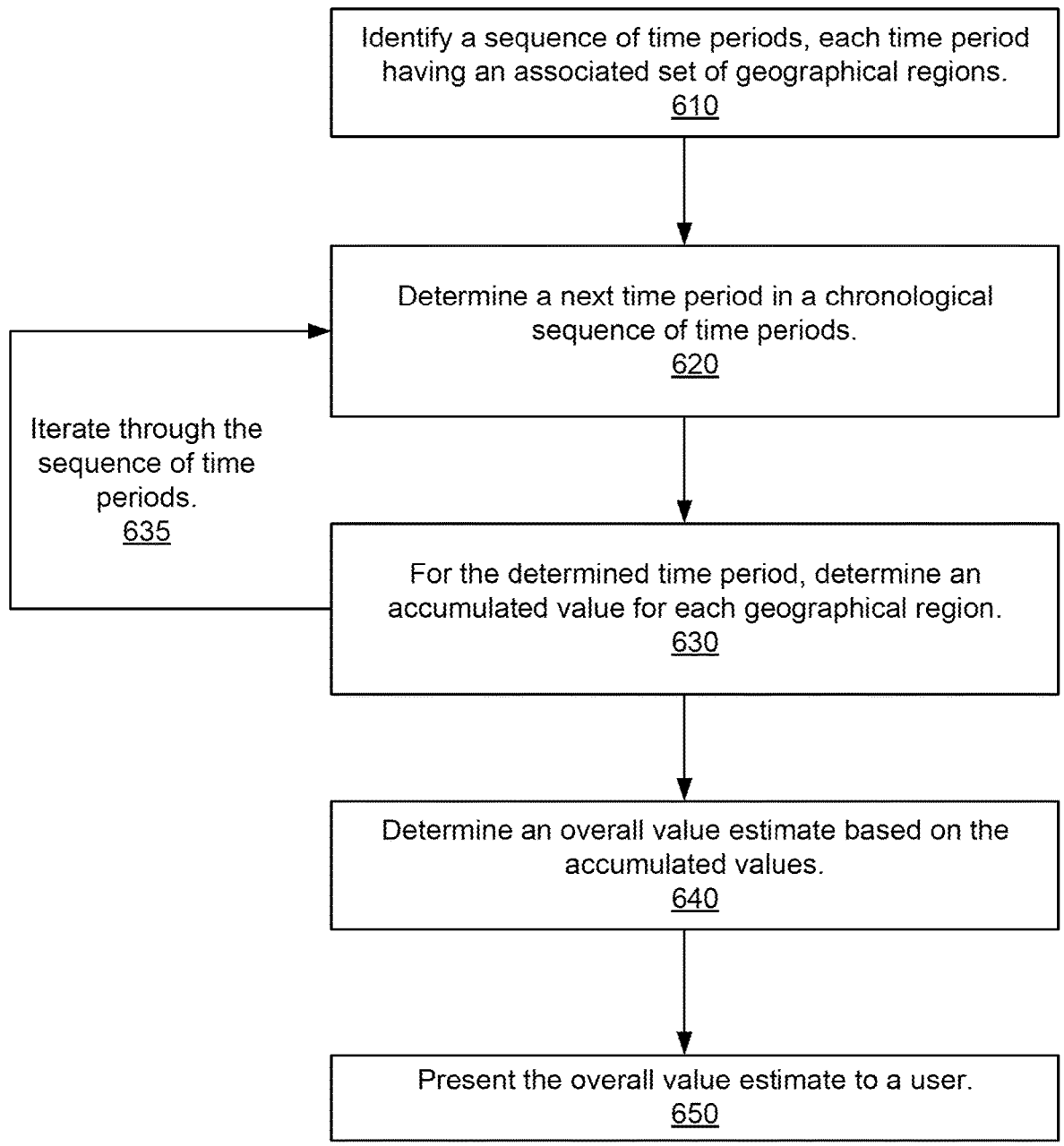
FIG. 6 is a flowchart illustrating a method of estimating value for a provider, in accordance with an embodiment.

FIG. 6 is a flowchart illustrating a method of estimating values for a provider, in accordance with an embodiment. The system 130 identifies a sequence of time periods, each time period having an associated set of geographical regions 610. For example, each row of geographical regions 410 in FIG. 5 are associated with a time period 510. Referring back to FIG. 6, the system 130 traverses the sequence of time periods from an ending time period to a starting time period in reverse chronological order. Note that, in one embodiment, the sequence of time periods may be traversed in chronological order rather than in reverse chronological order.

In the process of traversing the sequence of time periods, for each time period, the system determines a next time period in the sequence of time periods 620. For the determined time period, the system determines an accumulated value for each geographical region 630 associated with the time period. An accumulated value is based on a set of transitions between the geographical region and other geographical regions in a different time period. For example, an accumulated value for a geographical region may incorporate values associated with transitions from geographical regions in a subsequent time period. Transition value models from the transition value model store 240 may be applied to each transition to determine a likelihood of the transition occurring and to determine an expected value associated with the transition. The probability and the expected value are used to determine an accumulated value associated with a geographical region in a time period.

While there are more time periods in the sequence of time periods for which the system 130 has not yet determined accumulated values, the system iterates through the sequence of time periods 635. At each iteration, the system 130 determines a next time period in the sequence of time periods 620, and determines an accumulated value for each geographical region associated with the time period 630.

The system determines an overall value estimate in view of the accumulated values 640. In one embodiment, the value estimate is a final calculated accumulated value. In some embodiments, a value estimate is another combination of values associated with transitions between geographical regions. A value estimate may also be a set of multiple possible value estimates, or an estimated range of values. The system 130 presents the value estimate to a provider via a user device 650.

Figure 7:
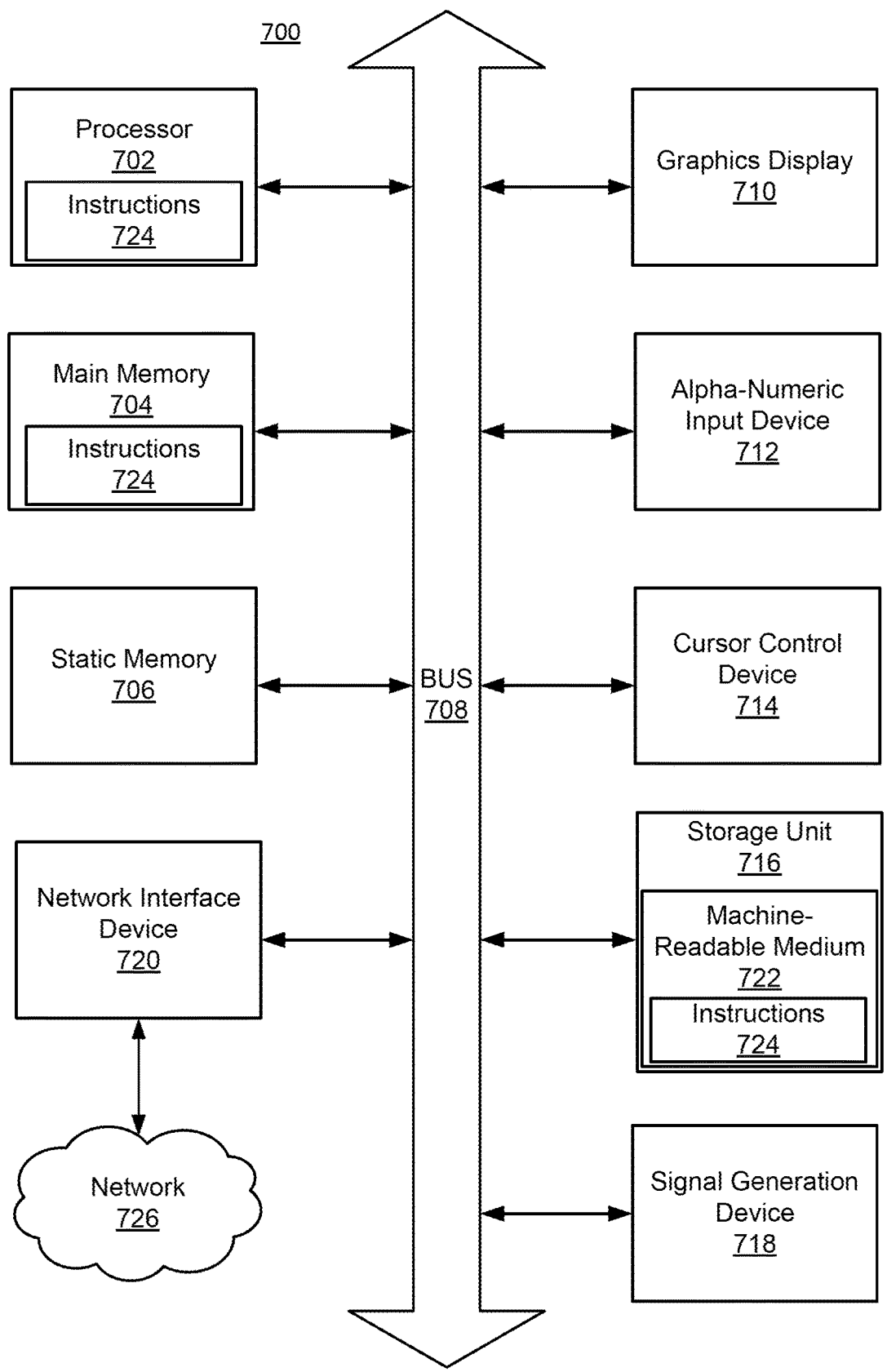
FIG. 7 is a block diagram illustrating components of an example machine for reading and executing instructions from a machine-readable medium, in accordance with an embodiment.

FIG. 7 is a block diagram illustrating components of an example machine for reading and executing instructions from a machine-readable medium. Specifically, FIG. 7 shows a diagrammatic representation of system 130 in the example form of a computer system 700. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 700 also includes a main memory 704. The computer system may include a storage unit 716. The processor 702, memory 704, and the storage unit 716 communicate via a bus 708.

In addition, the computer system 700 can include a static memory 706, a graphics display 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. For example, the instructions 724 may include the functionalities of modules of the system 130 described in FIG. 2. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure. For example, while the present disclosure discusses predicting provider involvement in potential safety incidents, the methods and systems herein can be used more generally for any purpose where one would want to predict involvement in potential incidents using a machine learning model.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method performed by a transport service system comprising:
receiving, via a first interactive user interface on a computing device of a user, data indicating an anticipated time period during which the user is available to provide transport service and an origin location in a geographic region;
querying a transition value model store to retrieve one or more transition models associated with the user, the one or more transition models developed using profile data and historical data associated with the user;
dividing the anticipated time period into a sequence of intervals, each interval having an associated set of geographic regions;
for a first interval in the sequence of intervals:
identifying, using the one or more transition models, one or more transitions between geographic regions that the user is likely to make during the interval, the one or more transition models (i) taking as input a starting geographic region and historical data associated with the starting geographic region, and (ii) outputting one or more probabilities that the user will move between two geographic regions within the interval; and determining an accumulated value for each transition;
iterating through the sequence of intervals to determine an accumulated value for each transition in each interval;
generating an overall value estimate for the anticipated time period based on the accumulated values; and
providing for display on a second interactive user interface on the computing device of the user, data corresponding to the overall value estimate.

2. The computer-implemented method of claim 1, wherein determining the accumulated value for each transition is further based on historical service data associated with the user.

3. The computer-implemented method of claim 1, wherein determining the accumulated value for each transition is further based on data associated with ongoing services.

4. The computer-implemented method of claim 1, wherein the historical data associated with the starting geographic region comprises, for each of a plurality of past services, one or more of: an origin location of the service, a destination location of the service, a duration of time of the service, a route, one or more geographic regions through which the route passes, and a value associated with the service.

5. A non-transitory computer-readable storage medium storing computer program instructions executable by one or more processors of a transport service system to perform steps comprising:
receiving, via a first interactive user interface on a computing device of a user, data indicating an anticipated time period during which the user is available to provide transport service and an origin location in a geographic region;
querying a transition value model store to retrieve one or more transition models associated with the user, the one or more transition models developed using profile data and historical data associated with the user;
dividing the anticipated time period into a sequence of intervals, each interval having an associated set of geographic regions;
for a first interval in the sequence of intervals:
identifying, using the one or more transition models, one or more transitions between geographic regions that the user is likely to make during the interval, the one or more transition models (i) taking as input a starting geographic region and historical data associated with the starting geographic region, and (ii) outputting one or more probabilities that the user will move between two geographic regions within the interval; and
determining an accumulated value for each transition;
iterating through the sequence of intervals to determine an accumulated value for each transition in each interval;
generating an overall value estimate for the anticipated time period based on the accumulated values; and
providing for display on a second interactive user interface on the computing device of the user, data corresponding to the overall value estimate.

6. The non-transitory computer-readable storage medium of claim 5, wherein determining the accumulated value for each transition is further based on historical service data associated with the user.

7. The non-transitory computer-readable storage medium of claim 5, wherein determining the accumulated value for each transition is further based on data associated with ongoing services.

8. The non-transitory computer-readable storage medium of claim 5, wherein the historical data associated with the starting geographic region comprises, for each of a plurality of past services, one or more of: an origin location of the service, a destination location of the service, a duration of time of the service, a route, one or more geographic regions through which the route passes, and a value associated with the service.

9. A computer system comprising:
one or more computer processors for executing computer program instructions; and
a non-transitory computer-readable storage medium storing instructions executable by the one or more computer processors to perform steps comprising:
receiving, via a first interactive user interface on a computing device of a user, data indicating an anticipated time period during which the user is available to provide transport service and an origin location in a geographic region;
querying a transition value model store to retrieve one or more transition models associated with the user, the one or more transition models developed using profile data and historical data associated with the user;
dividing the anticipated time period into a sequence of intervals, each interval having an associated set of geographic regions;
for a first interval in the sequence of intervals:
identifying, using the one or more transition models, one or more transitions between geographic regions that the user is likely to make during the interval, the one or more transition models (i) taking as input a starting geographic region and historical data associated with the starting geographic region, and (ii) outputting one or more probabilities that the user will move between two geographic regions within the interval; and
determining an accumulated value for each transition;
iterating through the sequence of intervals to determine an accumulated value for each transition in each interval;
generating an overall value estimate for the anticipated time period based on the accumulated values; and
providing for display on a second interactive user interface on the computing device of the user, data corresponding to the overall value estimate.

10. The computer system of claim 9, wherein determining the accumulated value for each transition is further based on historical service data associated with the user.

11. The computer system of claim 9, wherein determining the accumulated value for each transition is further based on data associated with ongoing services.

12. The computer system of claim 9, wherein the historical data associated with the starting geographic region comprises, for each of a plurality of past services, one or more of: an origin location of the service, a destination location of the service, a duration of time of the service, a route, one or more geographic regions through which the route passes, and a value associated with the service.

13. The computer-implemented method of claim 1, wherein the first interactive user interface includes a plurality of user interaction components for indicating one or more time ranges during which the user is available to provide service and one or more preferred geographic regions.

14. The computer-implemented method of claim 1, wherein the one or more transition models are further trained using past service data about likelihoods of service requests occurring within a geographic region at a specified time and destination locations associated with services from the geographic region.

15. The computer-implemented method of claim 1, further comprising:
   adjusting, by the one or more transition models, the accumulated values in real time as the user transitions between geographic regions and as actual value is accrued;
   determining, using the adjusted accumulated values, an updated overall value estimate for the user; and
   providing the updated overall value estimate for display on the user computing device.

16. The non-transitory computer-readable storage medium of claim 5, wherein the first interactive user interface includes a plurality of user interaction components for indicating one or more time ranges during which the user is available to provide service and one or more preferred geographic regions.

17. The non-transitory computer-readable storage medium of claim 5, wherein the one or more transition models are further trained using past service data about likelihoods of service requests occurring within a geographic region at a specified time and destination locations associated with services from the geographic region.

18. The non-transitory computer-readable storage medium of claim 5, wherein the steps further comprise:
   adjusting, by the one or more transition models, the accumulated values in real time as the user transitions between geographic regions and as actual value is accrued;
   determining, using the adjusted accumulated values, an updated overall value estimate for the user; and
   providing the updated overall value estimate for display on the user computing device.

19. The computer system of claim 9, wherein the one or more transition models are further trained using past service data about likelihoods of service requests occurring within a geographic region at a specified time and destination locations associated with services from the geographic region.

20. The computer system of claim 9, wherein the steps further comprise:
   adjusting, by the one or more transition models, the accumulated values in real time as the user transitions between geographic regions and as actual value is accrued;
   determining, using the adjusted accumulated values, an updated overall value estimate for the user; and
   providing the updated overall value estimate for display on the user computing device.

* * * * *